(12) United States Patent
Humburg

(10) Patent No.: US 9,482,447 B2
(45) Date of Patent: Nov. 1, 2016

(54) HEAT EXCHANGER ARRANGEMENT, ESPECIALLY FOR A FUEL-OPERATED VEHICLE HEATER

(75) Inventor: Michael Humburg, Göppingen (DE)

(73) Assignee: Eberspaecher Climate Control Systems GmbH & Co. KG, Esslingen am Neckar (DE)

( * ) Notice: Subject to any disclaimer, the term of this patent is extended or adjusted under 35 U.S.C. 154(b) by 729 days.

(21) Appl. No.: 13/396,983

(22) Filed: Feb. 15, 2012

(65) Prior Publication Data

US 2012/0205066 A1 Aug. 16, 2012

(30) Foreign Application Priority Data

Feb. 15, 2011 (DE) .......... 10 2011 004 159

(51) Int. Cl.
| | | |
|---|---|---|
| *F28F 3/12* | (2006.01) | |
| *F28F 9/00* | (2006.01) | |
| *F24H 9/00* | (2006.01) | |
| *B60H 1/22* | (2006.01) | |
| *F24H 1/00* | (2006.01) | |
| *F24H 1/12* | (2006.01) | |
| F28F 13/06 | (2006.01) | |
| F28D 7/12 | (2006.01) | |
| F28F 1/26 | (2006.01) | |

(52) U.S. Cl.
CPC .......... *F24H 9/0015* (2013.01); *B60H 1/2209* (2013.01); *F24H 1/009* (2013.01); *F24H 1/124* (2013.01); *F28D 7/12* (2013.01); *F28F 1/26* (2013.01); *F28F 9/00* (2013.01); *F28F 13/06* (2013.01); *F28F 2220/00* (2013.01)

(58) Field of Classification Search
CPC ........ F24H 1/009; B60H 1/2209; B60H 1/22
USPC .......................................... 237/28; 122/136 R
See application file for complete search history.

(56) References Cited

U.S. PATENT DOCUMENTS 2,844,140 A * 7/1958 Wein .................... B60H 1/2212
126/116 R
2,917,030 A * 12/1959 Tramontini ................... 122/149
(Continued)

FOREIGN PATENT DOCUMENTS

| CN | 85104503 B | 12/1986 |
|---|---|---|
| CN | 201672671 U | 12/2010 |

(Continued)

*Primary Examiner* — Avinash Savani
*Assistant Examiner* — Deepak Deean
(74) *Attorney, Agent, or Firm* — McGlew and Tuttle, P.C.

(57) ABSTRACT

A heat exchanger arrangement, especially for a fuel-operated vehicle heater, has a pot-shaped heat exchanger housing (12) elongated in the direction of a longitudinal axis (L) with a circumferential wall area (14) and, in an end area (18), a bottom wall area (16). A flow space (30) for heat carrier medium is formed in the heat exchanger housing (12) with a circumferential flow space (32) and with a bottom flow space (34) that is in connection with the circumferential flow space. The heat exchanger housing (12) includes a first housing part (36) and a second housing part (38). The first housing part includes an outer circumferential wall (40), an inner circumferential wall (42) and an inner bottom wall (46) adjoining the inner circumferential wall. The second housing part includes an outer bottom wall (62), which is or can be connected to the outer circumferential wall (40) in one end area.

18 Claims, 3 Drawing Sheets

(56) References Cited

U.S. PATENT DOCUMENTS

| | | | | |
|---|---|---|---|---|
| 2,990,877 A | * | 7/1961 | Tramontini | B60H 1/2212 431/266 |
| 3,186,696 A | * | 6/1965 | Kornelius | C03B 5/08 432/156 |
| 4,327,672 A | * | 5/1982 | Viessmann | F24H 1/263 122/136 C |
| 4,329,943 A | * | 5/1982 | Schworer | 122/13.01 |
| 4,543,943 A | * | 10/1985 | Gruber et al. | 122/18.1 |
| 4,590,888 A | * | 5/1986 | Mosig | F24H 1/263 122/135.3 |
| 4,624,218 A | | 11/1986 | Baeuml et al. | |
| 4,637,371 A | * | 1/1987 | Rathel | 126/110 B |
| 4,640,262 A | * | 2/1987 | Lucius | F23D 11/404 126/110 B |
| 4,905,895 A | * | 3/1990 | Grebe et al. | 237/12.3 C |
| 5,413,279 A | * | 5/1995 | Quaas et al. | 237/12.3 C |
| 5,653,387 A | * | 8/1997 | Takayanagi et al. | 237/12.3 C |
| 5,788,150 A | * | 8/1998 | Bittmann | 237/12.3 C |
| 5,947,717 A | * | 9/1999 | Steiner | B60H 1/2203 126/116 R |
| 5,983,841 A | * | 11/1999 | Haber | 122/18.1 |
| 6,082,625 A | * | 7/2000 | Faccone | B60H 1/032 237/12.3 C |
| 6,089,465 A | * | 7/2000 | Habijanec et al. | 237/12.3 C |
| 6,932,151 B2 | * | 8/2005 | Galtz | 165/58 |
| 2003/0230404 A1 | * | 12/2003 | Herrmann | B60H 1/2209 165/287 |
| 2004/0232252 A1 | * | 11/2004 | Paul | G05D 23/1951 237/28 |
| 2010/0065098 A1 | * | 3/2010 | Budde et al. | 136/205 |

FOREIGN PATENT DOCUMENTS

| | | |
|---|---|---|
| DE | 34 16 878 A1 | 11/1985 |
| DE | 197 49 809 A1 | 5/1999 |
| DE | 199 09 395 A1 | 9/2000 |
| DE | 101 55 844 A1 | 6/2002 |
| DE | 101 43 479 C1 | 1/2003 |
| EP | 1 296 101 A2 | 3/2003 |
| EP | 1541935 A2 | 6/2005 |

\* cited by examiner

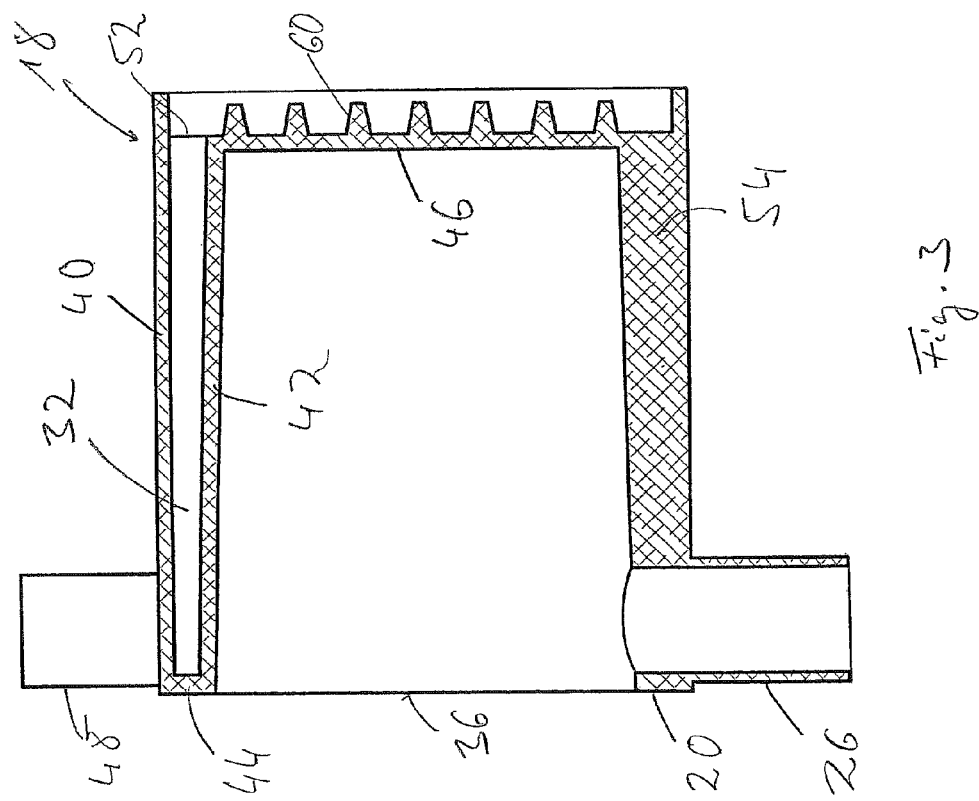
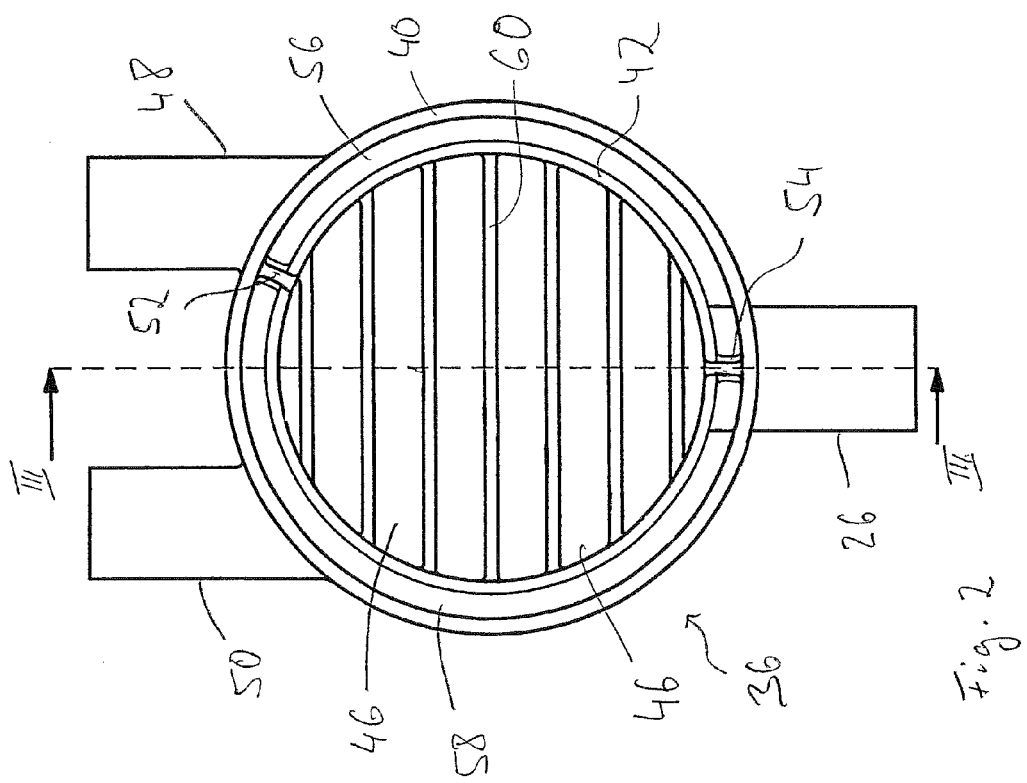

HEAT EXCHANGER ARRANGEMENT, ESPECIALLY FOR A FUEL-OPERATED VEHICLE HEATER

CROSS REFERENCE TO RELATED APPLICATIONS

This application claims the benefit of priority under 35 U.S.C. §119 of German Patent Application DE 10 2011 004 159.1 filed Feb. 15, 2011, the entire contents of which are incorporated herein by reference.

FIELD OF THE INVENTION

The present invention pertains to a heat exchanger arrangement, especially a fuel-operated vehicle heater, comprising a pot-shaped heat exchanger housing elongated in the direction of a longitudinal axis with a circumferential wall area and, in an end area of the circumferential wall area, with a bottom wall area, wherein a flow space for heat carrier medium is formed in the heat exchanger housing with a circumferential flow space and with a bottom flow space that is in connection with the circumferential flow space, wherein the heat exchanger housing comprises a first housing part and a second housing part enclosing the flow space in connection with the first housing part.

BACKGROUND OF THE INVENTION

Heat exchanger arrangements, whose heat exchanger housing with a generally pot-shaped design is composed of two housing parts, which are each pot-shaped, are known. One of the housing parts comprises an outer circumferential wall and an outer bottom wall made integrally in one piece therewith. The other of the housing parts comprises an inner circumferential wall and an inner bottom wall made integrally in one piece therewith. The two pot-shaped housing parts are inserted one into another and are connected to one another in a fluid-tight manner in their end area located away from the bottom wall, so that a flow space for the heat carrier medium with a circumferential flow space and with a bottom flow space is formed between the respective walls.

SUMMARY OF THE INVENTION

An object of the present invention is to design a heat exchanger arrangement, especially for a fuel-operated vehicle heater, such that a possibility for a simpler and hence also more cost-effective manufacture is obtained.

This object is accomplished according to the present invention by a heat exchanger arrangement, especially for a fuel-operated vehicle heater, comprising a pot-shaped heat exchanger housing elongated in the direction of a longitudinal axis with a circumferential wall area and, in an end area of the circumferential wall area, with a bottom wall area, wherein a flow space for heat carrier medium is formed in the heat exchanger housing with a circumferential wall space and with a bottom flow space that is in connection with the circumferential flow space, wherein the heat exchanger housing comprises a first housing part and a second housing part enclosing the flow space with the first housing part, wherein the first housing part comprises:
   an outer circumferential wall,
   an inner circumferential wall,
   an inner bottom wall adjoining the inner circumferential wall in one end area,
wherein the second housing part comprises:
   an outer bottom wall, which is or can be connected to the outer circumferential wall in one end area.

The breakdown of the different walls between two housing parts is different in the heat exchanger arrangement designed according to the present invention than in the state of the art. In particular, the entire circumferential wall area, i.e., both the outer circumferential wall and the inner circumferential wall, are provided at one and the same housing component and hence as components that are integral with one another. In particular, a material optimized for heat absorption or with respect to resistance to heat can be used for this first housing component, while the second housing component is arranged in a thermally less critical area and must therefore be made less demanding in this respect.

To introduce and remove heat carrier medium into and from the flow space, it is proposed that a heat carrier medium inlet and a heat carrier medium outlet be provided at the outer circumferential wall, wherein said inlet or/and outlet may be provided, for example, with respective fittings and hence designed as an integral component of the first housing part.

To support the prevention of a flow cross-section between the heat carrier medium inlet and the heat carrier medium outlet, it is proposed that the heat carrier medium inlet and the heat carrier medium outlet be offset in relation to one another in the circumferential direction.

Furthermore, a defined flow routing can be supported in the flow space by the first housing part comprising, between the inner circumferential wall and the outer circumferential wall, at least one partition extending in the direction of the longitudinal axis. Highly efficient flow past especially the inner circumferential wall and the inner bottom wall can be forced by two partitions arranged at spaced locations from one another in the circumferential direction defining a first circumferential flow space area that is in connection with the heat carrier medium inlet and a second circumferential flow space area that is in connection with the heat carrier medium outlet.

The heat transfer interaction between the first housing part and the heat transfer medium flowing in the flow space can be improved by the first housing part comprising at least one first guide projection on a side of the inner bottom wall facing the bottom flow space.

The defined flow routing of the heat carrier medium in the flow space can be supported in this case by the at least one first guide projection extending in the direction from the first circumferential flow space area to the second circumferential flow space area.

A further contribution can be obtained to the defined flow routing by the second housing part comprising at least one second guide projection on a side of the outer bottom wall facing the bottom flow space and by at least one first guide projection and a second guide projection associated herewith extending, preferably mutually in contact with one another, in the same direction in the bottom flow space. Flow channels, which contribute to a further improvement of the heat absorption characteristic, can be defined in the bottom flow space due to such an arrangement.

To connect the second housing part to the first housing part, it is proposed that the second housing part comprise, in an outer edge area, a connection edge area to connect the second housing part to the outer circumferential wall of the first housing part in a fluid-tight manner. If provisions are now made, for example, for the connection edge area to be ring-shaped and positioned such that it meshes with the outer circumferential wall, stable fixation of the second housing part to the first housing part, which fixation is also stable against the escape of heat carrier medium, can be obtained by a press fit. Additional fastening members, e.g., fastening screws or the like, may, of course, be used to prevent separation of the second housing part from the first housing part or leakage of heat carrier medium.

To make it possible to affect the flow of the heat carrier medium further, it is proposed for the second housing part to comprise at least one guide rib, which extends into the circumferential flow space and preferably touches the outer circumferential wall or/and the inner circumferential wall. Such guide ribs have not only the function of routing the heat carrier medium in a certain direction. Especially if they touch the circumferential walls, they can also contribute to an enlargement of the surface used for heat transfer.

The effect of flow routing or also of the improved heat transfer can be further intensified by a plurality of guide ribs being provided starting from an outer edge area of the second housing part.

Due to the breakdown of the heat exchanger housing provided according to the present invention into the two housing parts, it becomes possible to use a material that can correspondingly also withstand a higher thermal load where a higher thermal load occurs, whereas more cost-effective material, which can withstand a lower thermal load, can be used where a comparatively low thermal load is present. Provisions may be made, in particular, for the first housing part to be made of a metallic material, preferably aluminum material, or/and for the second housing part to be made of a plastic material.

The present invention pertains, furthermore, to a vehicle heater, comprising a burner area and a heat exchanger arrangement according to the present invention for transferring heat of combustion made available in the burner area to a preferably liquid heat carrier medium. The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a sectional view showing first housing part of the heat exchanger arrangement according to FIG. 1 viewed in direction of view II in FIG. 1;

FIG. 3 is a sectional view showing the first housing part in a longitudinal section, cut along a line III-III in FIG. 2;

DESCRIPTION OF THE PREFERRED EMBODIMENTS

Figure 1:
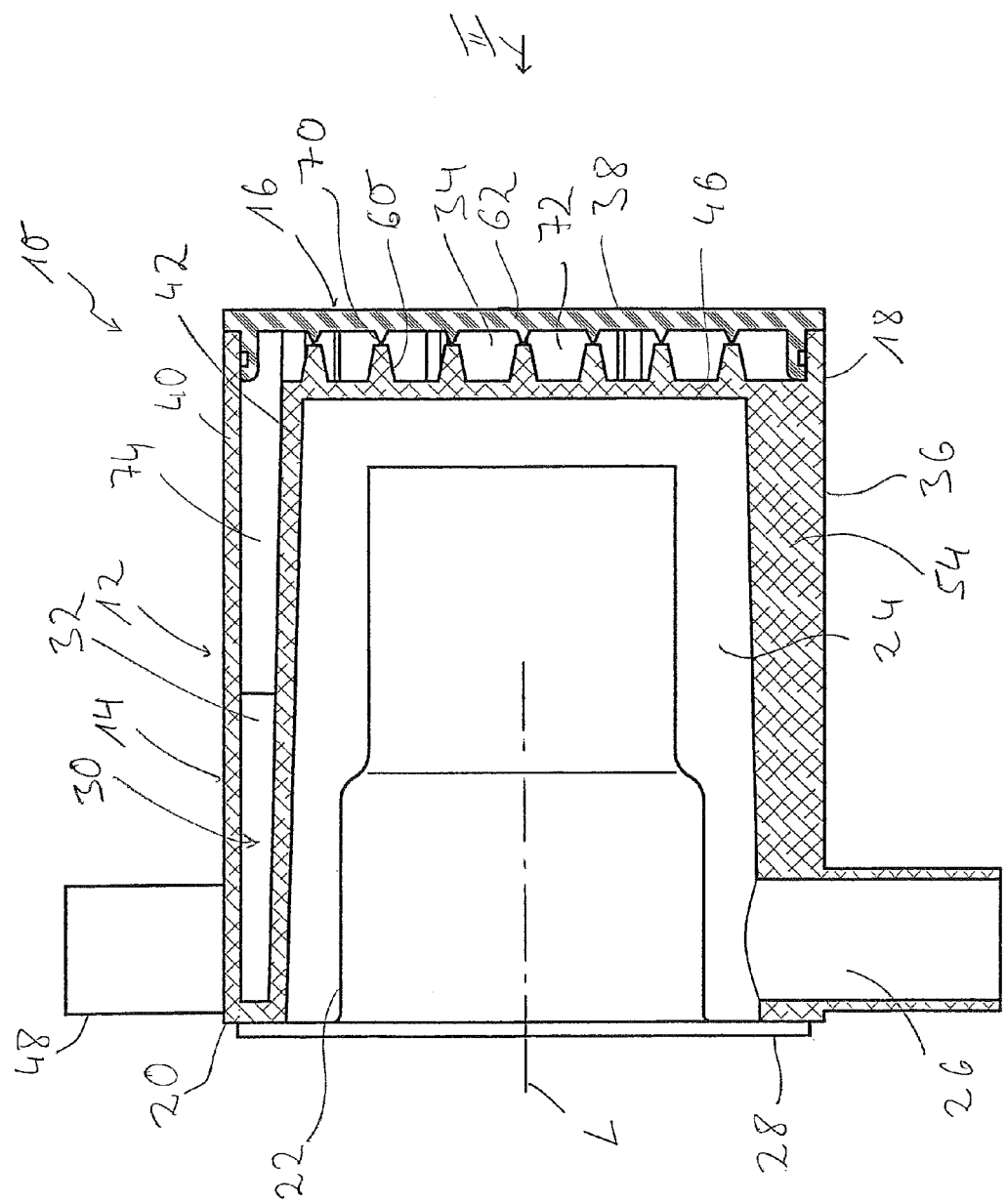
FIG. 1 is a longitudinal sectional view showing a heat exchanger arrangement.

Referring to the drawings in particular, FIG. 1 shows a heat exchanger arrangement 10 for a fuel-operated vehicle heater in a longitudinal view. The heat exchanger arrangement 10 comprises a pot-shaped heat exchanger housing 12 with a circumferential wall area 14, which is elongated essentially in the direction of a longitudinal axis L, and a bottom wall area 16. This adjoins, in an end area 18, the circumferential wall area 14. In the other end area 20, the circumferential wall area 14 adjoins the burner area of a vehicle heater, not shown here. Fuel is burned in this burner area together with combustion air. The combustion waste gases flow in a flame tube 22 in the direction of the bottom wall area 16. The combustion waste gases are discharged in an end area of the flame tube 22 located opposite the bottom wall area 16 and flow along a waste gas flow space 24 to a waste gas outlet 26. Flame tube 22 may be carried on a plate-like carrier 28 in order to thus obtain a closure of the waste gas flow space 24 in the end area 20.

A flow space 30 for a preferably liquid heat carrier medium is formed in heat exchanger housing 12. Flow space 30 comprises in the circumferential wall area 14 a circumferential flow space 32 and comprises in the bottom wall area 16 a bottom flow space 34, which adjoins the circumferential flow space 32 in end area 18.

Heat exchanger housing 12 comprises a first housing part 36, described in more detail below with reference to FIGS. 2 and 3, as well as a second housing part 38, described in more detail below with reference to FIGS. 4 and 5. These two housing parts 36, 38 enclose essentially the flow space 30 for the heat carrier medium.

The first housing part shown in FIGS. 2 and 3 comprises as integral components thereof an outer circumferential wall 40 and, arranged radially within same and at a radially spaced location therefrom, an inner circumferential wall 42. In end area 20, i.e., the end area of housing part 36 located away from the bottom wall area 16, a ring-shaped connection wall area 44 connects the outer circumferential wall 40 to the inner circumferential wall 42, so that the circumferential flow space 32 is closed in a fluid-tight manner in this axial end area 20 of the circumferential flow space 32.

In end area 18, an inner bottom wall 46 adjoins the inner circumferential wall 42. This inner bottom wall 46 encloses, together with inner circumferential wall 42, the waste gas flow space 24. The combustion waste gases discharged from flame tube 22 flow directly to the inner bottom wall 46, from which they are deflected radially outwardly.

A heat carrier medium inlet 48 designed, for example, in the form of a connecting branch, is provided at the outer circumferential wall 40. In case it is designed as a connecting branch, it may form an integral component of the first housing part 36. A heat carrier medium outlet 50, which is likewise designed, for example, in the form of a connecting branch and which may likewise be an integral part of the first housing part 36, is provided in the circumferential direction at a spaced location from the heat carrier medium inlet 48 and, for example, at approximately the same axial level. Waste gas outlet 26 is likewise designed in the example being shown in the form of a connecting branch, which extends through the outer circumferential wall 40 to the inner circumferential wall 42 and is thus open to the waste gas flow space 24 enclosed by the inner circumferential wall 42. Waste gas outlet 26 may be provided as an integral part of the first housing part 36.

It should be pointed out here that the different inlets and outlets may, of course, also be designed in another configuration, for example, as openings in respective walls. Furthermore, it is also possible to provide the different inlets and outlets as separate components and to connect them to the first housing part 36, for example, by material connection if they are designed as connecting branches, and the different inlets and also outlets do not necessarily have to be of the same design and do not necessarily have to be connected to the first housing part.

The circumferential flow space 32 between the two circumferential walls 40, 42 is divided by two partitions 52, 54, which are at circumferentially spaced locations from one another and extend approximately in the direction of longitudinal axis L, into a first circumferential flow space area 56 and a second circumferential flow space area 58. Partitions 52, 54 may likewise be provided as integral parts of the first housing part 36. The first circumferential flow space area 56 leads from the heat exchanger medium inlet 48 in the direction of the bottom flow space 34. The second circumferential flow space area 58 leads from the bottom flow space 34 back in the direction of the heat carrier medium outlet 50, so that the heat carrier medium has essentially opposite axial flow directions in relation to one another in the two circumferential flow space areas 56, 58.

A plurality of first rib-like projections 60 are provided on the side of the inner bottom wall 46 facing the bottom flow space 34, i.e., facing away from the waste gas flow space 24. These projections are located at mutually spaced locations and extend in the exemplary embodiment being shown essentially in a straight line along the inner bottom wall 46 in bottom flow space 34. It is seen in FIG. 2 that the first projections 60 extend essentially from the first circumferential flow space area 56 or a circumferential area corresponding to this in the direction of the second circumferential flow space area 58 or a circumferential area corresponding to this. The first projections 60 thus support the flow of the heat carrier medium from the first circumferential flow space area 56 to the second circumferential flow space area 58 and at the same time enlarge the surface of the first housing part 36 available for heat transfer.

The first housing part 36 can be manufactured as a metal component in a die-casting operation with all the functional areas formed integrally thereon, especially the two circumferential walls 40, 42 and inner bottom wall 46, first projections 60 and partitions 52, 54. For example, aluminum material may be used for this. This guarantees that a material that can withstand very high thermal loads is used wherever comparatively high thermal loads occur, namely, on the one hand, where the first housing part 36 with its two circumferential walls 40, 42 adjoins the burner area, i.e., in end area 20, and where the hot combustion waste gases come into contact with the first housing part 36, namely, inner bottom wall 46 and inner circumferential wall 42. As is shown in FIGS. 2 and 3, it is easily possible to produce such a first housing part 36 with a die-casting operation by providing respective mold release bevels at the circumferential walls 40, 42, partitions 52, 54 and also first projections 60 with casting molds of a correspondingly simple shape.

Figure 4:
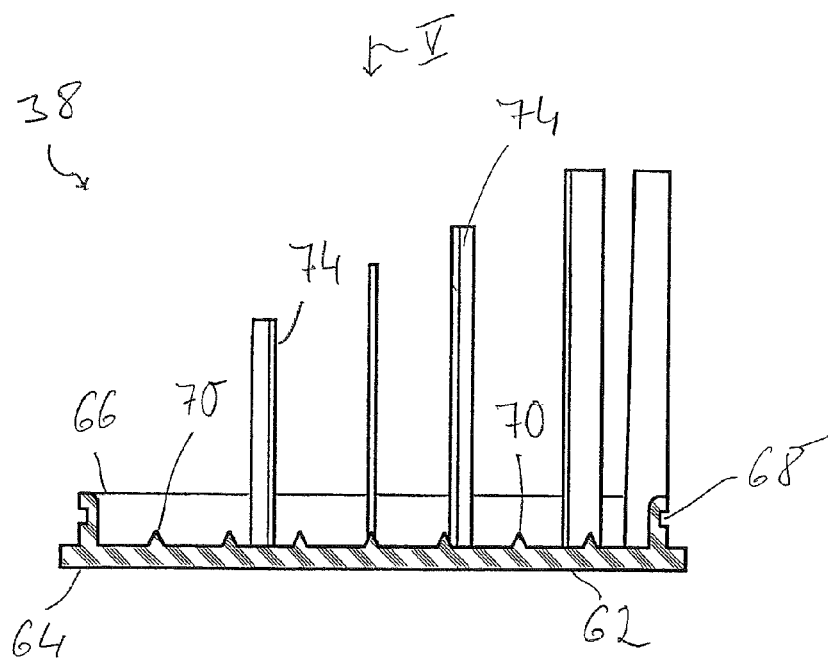
FIG. 4 is a longitudinal sectional view of a second housing part of the heat exchanger arrangement according to FIG. 1.
Figure 5:
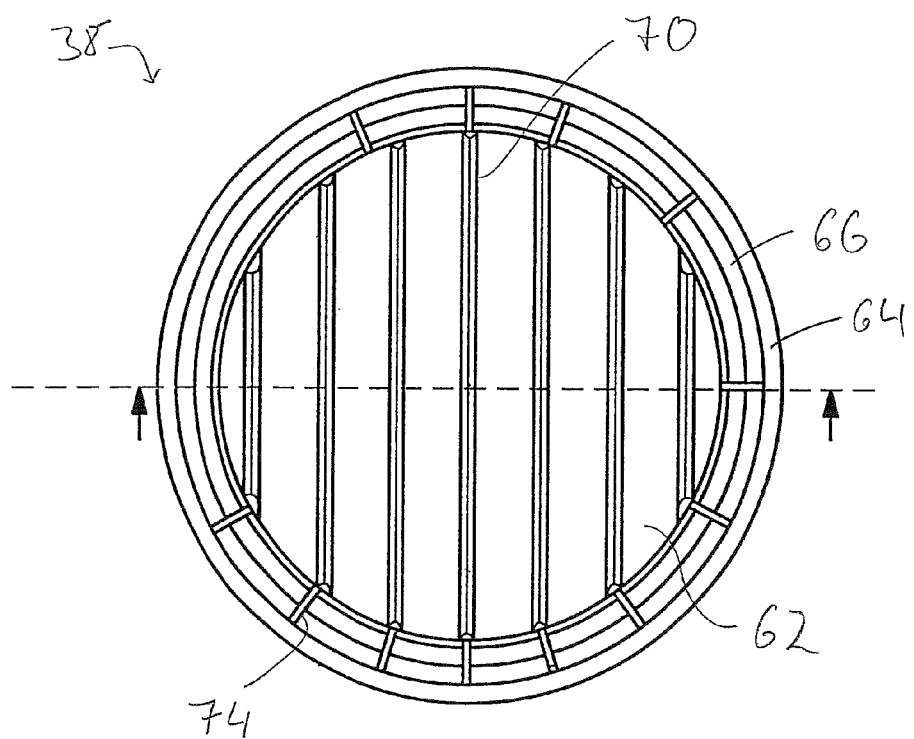
FIG. 5 is an axial view of the second housing part according to FIG. 4 in the direction of view V in FIG. 4.

The second housing part 38 shown in FIGS. 4 and 5 comprises as an essential component an outer bottom wall 62, which is located axially opposite the inner bottom wall 46 in the assembled state and defines with this inner bottom wall 46 the bottom flow space 34. A connection edge 66 extending preferably in a ring-shaped pattern over the entire outer edge area 64 is formed in an outer edge area 64 such that it extends axially away from the outer bottom wall 62. In the assembled state, connection edge 66 meshes in the end area 18 with the outer circumferential wall 40 and can be held there, for example, by press fit. A part of the outer bottom wall 62 still projecting radially over the connection edge 66 on the outside may end flush with the outer surface of the outer circumferential wall 40.

A groove-like recess 68 preferably extending peripherally may be formed at the outer surface of connection edge 66. For example, a sealing element supporting the fluid-tight closure of flow space 30, for example, an O-ring or the like, may be inserted into this recess 68. Furthermore, it is possible to form on the inner surface of the outer circumferential wall 40 a complementary locking projection, for example, one extending circumferentially in a ring-shaped pattern, which forms, in connection with recess 68, a locking connection of the second housing part 38 with the first housing part 36 and thus a stable connection. As an alternative or in addition, further connection elements, e.g., connection screws or locking tongues or the like, may, of course, be used to secure the second housing part 38 against unintended separation from the first housing part 36. A connection in material, e.g., bonding, is possible as well.

A plurality of second projections 70 are provided at mutually spaced locations from one another on the side of the outer bottom wall 62 facing the bottom flow space 34. Corresponding to the extension of the first projections 60, these extend essentially in a straight line and are arranged such that when the second housing part 38 is fixed to the first housing part 36, the first projections 60 and second projections 70 extend, touching each other in pairs, in the same direction, so that a flow channel 72 of the bottom flow space 34 is defined between a respective pair of first projection 68 and second projection 70 and an adjacent pair. A defined flow routing from the first circumferential flow space area 56 to the second circumferential flow space area 58 is supported in this manner. Furthermore, very uniform support of the second housing part 38 at the first housing part 36 is achieved approximately over the entire area of the outer bottom wall 62.

Starting from the outer edge area 64 of the second housing part 38, guide ribs 74 extend, for example, essentially at right angles to the outer bottom wall 62 at circumferentially mutually spaced locations. These are designed, just as connection edge 66 and second projections 70, as an integral part of the second housing part 38 and are connected in a stable manner to the outer bottom wall 62 due to the fact that they also extend starting from connection edge 66.

The guide ribs 74 extend approximately axially into the circumferential flow space 32 and may be in contact with the inner surface of the outer circumferential wall 40 by their radially outer area or/and with the outer circumferential surface of the inner circumferential wall 42 by their radially inner area. Thus, the guide ribs 74 thus support not only the flow routing of the heat carrier medium in the circumferential flow space 32, but they can also contribute to a larger heat transfer surface and hence to increased introduction of heat into the heat carrier medium due to their contact with the circumferential walls, especially the inner circumferential wall 42.

As this is shown in FIGS. 4 and 5, not all guide ribs 74 have to extend over the same length. It is also not absolutely necessary to provide a uniform distribution over the circumference. Even though all guide ribs 74 may be designed such that they extend over an equal length axially starting from the outer bottom wall 62 or/and with uniform circumferential distance from one another, the design and position of the guide ribs 74 may nevertheless be varied corresponding to the designed flow conditions in the flow space 30.

Since the second housing part 38 is positioned in an area that is subject to a comparatively low thermal load, it is not necessary to build this housing part 38 from a comparatively expensive material with high thermal stability, e.g., metallic material. Rather, plastic material may be used for the second housing part 38. The contact of the second projections 70 with the first projections 60 of the first housing part 36 also does not lead to an excessively high thermal load. It is seen especially from FIG. 4 that the second projections 70 are provided with an essentially pointed or roof-like cross-sectional profile, which causes the contact surface with the first projections 60 to be limited to a nearly linear contact area, which leads to a corresponding limitation of heat flow from the inner bottom wall 46 to the outer bottom wall 62.

The design according to the present invention of a heat exchanger housing with the two housing parts thereof makes it possible, while manufacturability is simple, namely, according to the casting method, to use generally expensive materials that can withstand high thermal loads only where comparatively high thermal loads also occur. Comparatively cost-effective material can be used where this is not the case. Furthermore, it is advantageous that the connection of the two housing parts likewise takes place in an area that is subject to a comparatively low thermal load, namely, in the end area of the heat exchanger housing facing away from a burner area. Thus, this connection is also subject to a lower thermal load, which makes it possible to use simpler and hence also more cost-effective connection means or sealants.

While specific embodiments of the invention have been shown and described in detail to illustrate the application of the principles of the invention, it will be understood that the invention may be embodied otherwise without departing from such principles.

What is claimed is:

1. A heat exchanger arrangement comprising:
   a first housing part comprising an outer circumferential wall, an inner circumferential wall and an inner bottom wall adjoining said inner circumferential wall in an inner circumferential wall end area, said outer circumferential wall, said inner circumferential wall and said inner bottom wall being integrally connected with one another to define a single, one-piece housing wall structure; and
   a second housing part comprising an outer bottom wall connected to said outer circumferential wall in an outer circumferential wall end area, said first housing part and said second housing part defining a pot-shaped heat exchanger housing that is elongated in a direction of a longitudinal axis and with a circumferential wall area and with a bottom wall area in an end area of said circumferential wall area and with a heat carrier medium flow space for heat carrier medium formed in said heat exchanger housing with a circumferential flow space and with a bottom flow space that is in connection with said circumferential flow space, said heat carrier medium flow space being enclosed by said first housing part and said second housing part, said inner circumferential wall and said outer circumferential wall defining at least a portion of said circumferential flow space, said outer bottom wall and said inner bottom wall defining at least a portion of said bottom flow space, said second housing part comprising an axially extending connection area in an outer edge area of said outer bottom wall, said second housing part being connected to said first housing part via a fluid-tight press fit connection, said axially extending connection area engaging said outer circumferential wall, wherein said axially extending connection area and said outer circumferential wall define at least a portion of said fluid-tight press fit connection, wherein said outer circumferential wall comprises an outer circumferential wall surface, said outer circumferential wall surface extending in a radial direction with respect to a longitudinal axis of said first housing, said outer bottom wall comprising an inner bottom wall surface, said inner bottom wall surface extending radially with respect to said longitudinal axis of said first housing, said inner bottom wall surface being in direct contact with said outer circumferential wall surface.

2. A heat exchanger arrangement in accordance with claim 1, further comprising a heat carrier medium inlet and a heat carrier medium outlet at said outer circumferential wall, wherein said heat carrier medium inlet and said heat carrier medium outlet are offset in relation to one another in a circumferential direction.

3. A heat exchanger arrangement in accordance with claim 2, wherein said first housing part comprises a partition extending in the direction of the longitudinal axis, between said inner circumferential wall and said outer circumferential wall, said another outer circumferential wall surface being perpendicular to said inner circumferential wall surface, said another housing surface being perpendicular to said second housing surface.

4. A heat exchanger arrangement in accordance with claim 3, wherein:
   said first housing part comprises another partition extending in the direction of the longitudinal axis to provide two partitions; and
   said two partitions are arranged at spaced locations from one another in the circumferential direction to define a first circumferential flow space area that is in connection with said medium inlet and a second circumferential flow space area that is in connection with said heat carrier medium outlet.

5. A heat exchanger arrangement in accordance with claim 1, wherein said first housing part comprises a guide projection on a side of said inner bottom wall facing said bottom flow space.

6. A heat exchanger arrangement in accordance with claim 4, wherein:
   said first housing part comprises a guide projection on a side of said inner bottom wall facing said bottom flow space; and
   said guide projection extends in a direction from said first circumferential flow space area to said second circumferential flow space area.

7. A heat exchanger arrangement in accordance with claim 1, wherein said second housing part comprises a second housing part guide projection on a side of said outer bottom wall facing said bottom flow space.

8. A heat exchanger arrangement in accordance with claim 1, wherein said second housing part comprises a guide rib, which extends into said circumferential flow space.

9. A heat exchanger arrangement in accordance with claim 8, wherein said guide rib, which extends into said circumferential flow space, touches at least one of said outer circumferential wall and said inner circumferential wall.

10. A heat exchanger arrangement in accordance with claim 8, wherein said second housing part comprises additional guide ribs to provide a plurality of guide ribs which extend from an outer edge area into said circumferential flow space.

11. A heat exchanger arrangement in accordance with claim 1, wherein at least one of said first housing part is made of metallic material and said second housing part is made of plastic material.

12. A vehicle heater, comprising:
   a burner area; and
   a heat exchanger arrangement for transferring heat of combustion provided in the burner area to a heat carrier medium, the heat exchanger arrangement comprising:

a first housing part comprising an outer circumferential wall, an inner circumferential wall and an inner bottom wall adjoining said inner circumferential wall in an inner circumferential wall end area, said outer circumferential wall, said inner circumferential wall and said inner bottom wall being integrally connected with one another to define a single, one-piece housing wall structure; and a second housing part comprising an outer bottom wall connected to said outer circumferential wall in an outer circumferential wall end area, said first housing part and said second housing part defining a pot-shaped heat exchanger housing that is elongated in a direction of a longitudinal axis and with a circumferential wall area and with a bottom wall area in an end area of said circumferential wall area and with a heat carrier medium flow space for heat carrier medium formed in said heat exchanger housing with a circumferential flow space and with a bottom flow space that is in connection with said circumferential flow space, said heat carrier medium flow space being enclosed by said first housing part and said second housing part, said inner circumferential wall and said outer circumferential wall defining at least a portion of said circumferential flow space, said outer bottom wall and said inner bottom wall defining at least a portion of said bottom flow space, said second housing part further comprising an axially extending connection area in an outer edge area of said outer bottom wall, said second housing part being connected to said first housing part via a fluid-tight press fit connection, said axially extending connection area engaging said outer circumferential wall, wherein said axially extending connection area and said outer circumferential wall define at least a portion of said fluid-tight press fit connection, wherein said outer circumferential wall comprises an outer circumferential wall surface, said outer circumferential wall surface extending in a radial direction with respect to a longitudinal axis of said first housing, said outer bottom wall comprising an inner bottom wall surface, said inner bottom wall surface extending radially with respect to said longitudinal axis of said first housing, said inner bottom wall surface being in direct contact with said outer circumferential wall surface.

13. A vehicle heater in accordance with claim 12, further comprising a heat carrier medium inlet and a heat carrier medium outlet at said outer circumferential wall, wherein said heat carrier medium inlet and said heat carrier medium outlet are offset in relation to one another in a circumferential direction, said inner circumferential wall being located at a radially spaced location from said outer circumferential wall with respect to a longitudinal axis of said first housing part, said second housing part having a second housing surface, said outer circumferential wall having an inner circumferential wall surface, said second housing surface and said inner circumferential wall surface extending in an axial direction with respect said longitudinal axis, said second housing surface engaging said inner circumferential wall surface, said second housing surface and said inner circumferential wall surface being located at or adjacent to said end area of said circumferential wall area.

14. A vehicle heater in accordance with claim 13, wherein:
said first housing part comprises a partition extending in the direction of the longitudinal axis, between said inner circumferential wall and said outer circumferential wall and another partition extending in the direction of the longitudinal axis to provide two partitions; and
said two partitions are arranged at spaced locations from one another in the circumferential direction to define a first circumferential flow space area that is in connection with said medium inlet and a second circumferential flow space area that is in connection with said heat carrier medium outlet, wherein said inner circumferential wall surface is parallel to said second housing surface.

15. A vehicle heater in accordance with claim 12, wherein:
said first housing part comprises a first housing part guide projection on a side of said inner bottom wall facing said bottom flow space;
said second housing part comprises a second housing part guide projection on a side of said outer bottom wall facing said bottom flow space; and
said first housing part guide projection and said second housing part guide projection extend toward each other in said bottom flow space such that said first housing part guide projection and said second housing part projection guide mutually touch each other.

16. A vehicle heater in accordance with claim 12, wherein: said second housing part comprises a guide rib, which extends into said circumferential flow space.

17. A vehicle heater in accordance with claim 12, wherein said axially extending connection area comprises a second housing surface, said outer circumferential wall having an inner circumferential wall surface, said second housing surface and said inner circumferential wall surface extending in an axial direction with respect said longitudinal axis of said first housing, said second housing surface engaging said inner circumferential wall surface, said second housing surface and said inner circumferential wall surface being located at or adjacent to said end area of said circumferential wall area, wherein at least a portion of said second housing surface is located in an interior space defined by said outer bottom wall, said outer circumferential wall, said inner circumferential wall and said inner bottom wall.

18. A heat exchanger arrangement comprising:
a first housing part comprising an outer circumferential wall, an inner circumferential wall and an inner bottom wall adjoining said inner circumferential wall in an inner circumferential wall end area, a one-piece housing component being provided by said outer circumferential wall, said inner circumferential wall and said inner bottom wall being integrally connected with each other; and a second housing part comprising an outer bottom wall connected to said outer circumferential wall in an outer circumferential wall end area, said first housing part and said second housing part defining a pot-shaped heat exchanger housing that is elongated in a direction of a longitudinal axis and with a circumferential wall area and with a bottom wall area in an end area of said circumferential wall area and with a flow space for heat carrier medium formed in said heat exchanger housing and enclosed by said first housing part and said second housing part, said flow space comprising a circumferential flow space defined between said outer circumferential wall and said inner circumferential wall of said first housing part and a bottom flow space defined between said outer bottom wall of said second housing part and said inner bottom wall of said first housing part, said bottom flow space being in connection with said circumferential flow space, said second housing part comprising, in an outer edge area of said outer bottom wall, an axially extending connection edge area engaging into said outer circumferential wall at said outer circumferential wall end area for a fluid-tight press fit connection of said second housing part to said outer circumferential wall of said first housing part; and a heat carrier medium inlet and a heat carrier medium outlet at said outer circumferential wall, wherein said heat carrier medium inlet and said heat carrier medium outlet are offset in relation to one another in a circumferential direction, said second housing surface having another housing surface, said another housing surface being adjacent to said second housing surface, said outer circumferential wall having another outer circumferential wall surface, said another housing surface being in direct contact with said another outer circumferential wall surface.

\* \* \* \* \*